United States Patent
Buck et al.

(10) Patent No.: US 6,735,296 B2
(45) Date of Patent: May 11, 2004

(54) METHOD AND APPARATUS FOR SWAPPING TELEPHONE NUMBERS BETWEEN SWITCHING MODULES

(75) Inventors: Kennard Ray Buck, Naperville, IL (US); Yangling Zhang, Batavia, IL (US)

(73) Assignee: Lucent Technologies Inc., Murray Hill, NJ (US)

(*) Notice: Subject to any disclaimer, the term of this patent is extended or adjusted under 35 U.S.C. 154(b) by 542 days.

(21) Appl. No.: 09/841,868

(22) Filed: Apr. 25, 2001

(65) Prior Publication Data

US 2002/0159579 A1 Oct. 31, 2002

(51) Int. Cl.[7] .................. H04M 7/00; H04M 3/42; G01R 31/08
(52) U.S. Cl. ............ 379/220.01; 379/211.02; 370/225
(58) Field of Search .............. 379/211.02, 220.01; 370/225

(56) References Cited

U.S. PATENT DOCUMENTS

| 4,807,279 A | * | 2/1989 | McClure et al. ....... 379/211.02 |
| 5,831,969 A | * | 11/1998 | Bales et al. ............... 370/225 |

* cited by examiner

Primary Examiner—Ahmad F. Matar
Assistant Examiner—Thjuan P Knowlin

(57) ABSTRACT

Telephone lines are moved from one or more switching modules (105 and 107) to one or more new switching modules (201) with minimal outage for customers whose lines are affected. Pseudo-lines are created (303) and the new switching module (201) and line data that supports customer features and routing of calls is programmed into the new switching module(s) (201). Connections are moved from the old module(s) (105 and 107) to the new module(s) (201), and the telephone numbers, i.e., routing information, is exchanged (309) between the modules in a single transaction.

19 Claims, 2 Drawing Sheets

METHOD AND APPARATUS FOR SWAPPING TELEPHONE NUMBERS BETWEEN SWITCHING MODULES

FIELD OF THE INVENTION

This invention relates to communication systems, including but not limited to switching modules in communication systems.

BACKGROUND OF THE INVENTION

Wireline communications are provided by routing calls from an originating device to a terminating device by utilizing telephone numbers. One of the basic pieces of equipment that facilitates wireline service is a communication switch. Such switches often handle routing for thousands of calls at a time.

From time to time, the switch needs to be updated or replaced for various reasons, including failure, technological update, capacity increase, feature enhancement, and switching center floor space reduction. Previous methods of moving telephone lines from one switching module to another switching module, while reusing current peripheral subscriber line units, involved moving subscriber data from the old switching module to the new switching module, exchanging lines between the switching modules, and activating the new switching module. The duration of subscriber downtime in previous methods is a function of the time to move subscriber data from the old switching module to the new switching module. During this process, a subscriber may experience extensive downtime. Because such lack of service is undesirable, the process is typically performed overnight, and only a few switches are able to be exchanged in one night because of the time required to perform the process.

Accordingly, there is a need for a faster and reliable manner of exchanging switching modules.

SUMMARY OF THE INVENTION

A method of the present invention comprises the steps of mapping a plurality of existing telephone numbers for a plurality of existing lines at a first switching module to a plurality of pseudo-telephone numbers. For each of the plurality of existing lines, a pseudo-line is created at a second switching module, yielding a plurality of pseudo-lines. A transaction is generated that swaps the telephone numbers in the first switching module with the pseudo-telephone numbers in the second module. The transaction is executed, for example, by user request.

DESCRIPTION OF A PREFERRED EMBODIMENT

The following describes an apparatus for and method of transferring or moving lines from one or more switching modules to one or more new switching modules with minimal outage for customers whose lines are affected. Pseudo-lines are created and the new switching module and line data that supports customer features and routing of calls is programmed into the new switching module(s). Connections are moved from the old module(s) to the new module(s), and the telephone numbers, i.e., routing information, is exchanged between the modules in a single transaction.

Figure 1:
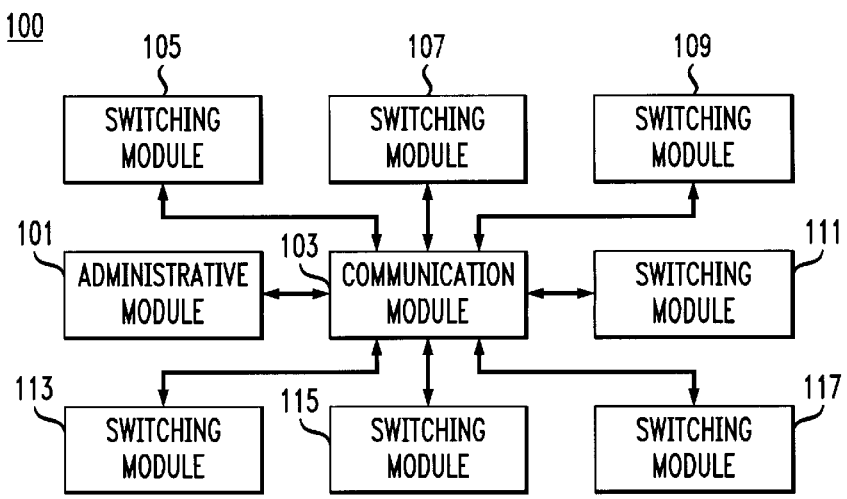
FIG. 1 is a block diagram of a switching center in accordance with the invention.

The block diagram of FIG. 1 shows a switching center 100 comprising an administrative module (AM) 101, a communication module (CM) 103, and a plurality of switching modules (SMs) 105, 107, 109, 111, 113, 115, and 117. The AM 101 supports the operation, administrative, maintenance, and provisioning of the switch and provides the functions of, for example, human-machine interface, system recovery, system backup, and all other operation and administrative management functions to the switching center 100. The AM 101 may be, for example, a UNIX-based device. The CM 103 provides a hub of communication for both voice and signaling and provides the basic functions of, for example, timeslot interchange or communication from and to all distributed processors in the switching center 100. The switching modules 105 to 117 generally support line units and trunk units as known in the art. The SMs 105 to 117 support telephone line functions such as, for example, dial tone, routing information for origination and termination of phone calls, and call features, such as call waiting, caller identification (ID), voice mail, call forwarding, and Centrex or Private Business Exchange services. The switch 100 may be, for example, a 5ESS® switch available from Lucent Technologies, Inc. Although seven switching modules 105 through 117 are shown in FIG. 1, one or more switching modules may be interconnected with the CM 103 in a communication system. In some applications, such as international applications, the CM 103 may be integrated into the AM 101, in which case any CM 103 functions provided under the present invention would be performed by the AM 101.

Figure 2:
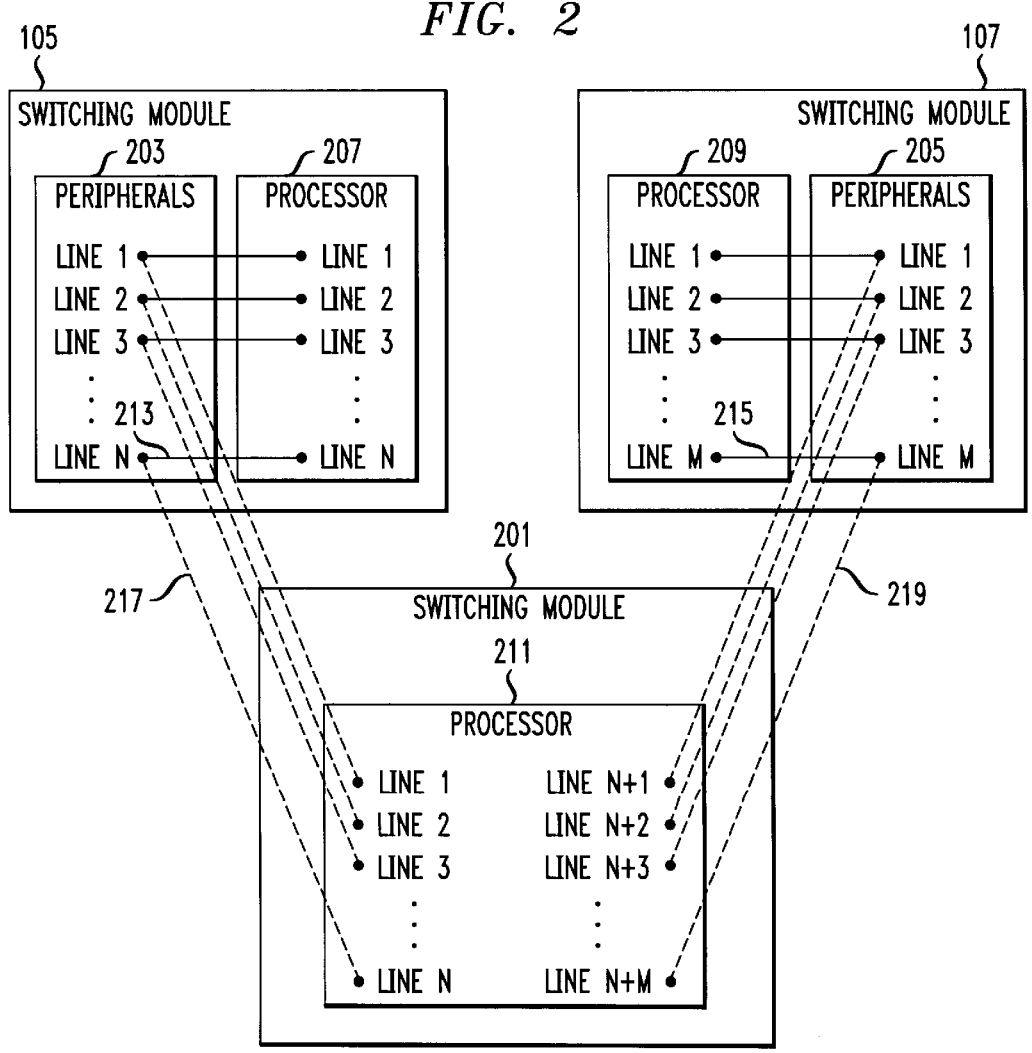
FIG. 2 is a block diagram illustrating the exchange of telephone lines from one set of switching modules to another switching module in accordance with the invention.

A block diagram illustrating the exchange of lines from one set of "old" switching modules to a "new" switching module is shown in FIG. 2. In the example shown, the old switching modules 105 and 107, i.e., the ones in which the lines will be switched out, each have a peripheral section 203 and 205, respectively, that provide various functions for each line, including providing dial tone. The peripherals 203 and 205 include, for example, integrated digital carrier unit (IDCU), line unit (LU), digital carrier line unit (DCLU), which units provide battery feed, over-voltage protection, ringing, signalling, CODECs, hybrid, and test, commonly known as the BORSCHT functions. Each of the old switching modules 105 and 107 has a processor section 207 and 209, respectively, that stores line information that will be transferred to and supported by processor 211 in the new switching module 201. In this example, the peripheral section 203 and 205 will remain in service, i.e., be reused or used in conjunction with the new switching module 201. Also, in this example, the new switching module 201 has enough capacity for the lines from both of the old SMs 105 and 107.

The new switching module 201 is connected to the CM 103. A pseudo-telephone line is created or generated in the new processor 211 for each of the existing telephone lines that will be switched from the old SMs 105 and 107 to the new SM 201, e.g., N lines in the first SM 105 and M lines in the second SM 107, where N and M are integers. Each pseudo-telephone line is associated with an existing telephone line and includes information such as a pseudo-telephone number and the features for the existing telephone line associated with the pseudo-telephone line. The features, include, for example, call forwarding, call waiting, caller ID, voice mail, call forwarding, and Centrex or Private Business Exchange services, among many other features. The pseudo-telephone lines mirror the existing lines with the exception that the pseudo-telephone number routes to the new SM 201 rather than the old SM 105 or 107. For example, the existing telephone number may be (630) 123–1234, and the associated telephone number may be (630) 999–1234. The information from an existing line may be, for example, downloaded from the old SM 105 or 107 to the new SM 201 via a software command from the AM 101 through the CM 103 to the appropriate SM 105, 107, or 201. The line (pseudo and existing) information may be stored in a relational database that is distributed among the processors 207, 209, and 211, and as necessary to the AM 101.

Once all the line data is programmed into the new switching module 201, the original connections 213 and 215 for each line between the peripherals 203 and 205 and the processors 207 and 209 are switched or moved over to the processor 211 in the new switching module 201, thereby creating new connections 217 and 219 between the old peripherals 203 and 205 and the processor 211 in the new switching module 201. For example, there may be two types of physical connections for each line that are manually moved from the old module 105 or 107 to the new module 201: a PIDB (Peripheral Interface Data Bus) and a PICB (Peripheral Interface Control Bus), as known in the art. Several PIDBs and PICBs may be provided in each peripheral unit 203 and 205. Once the lines are physically moved, the telephone numbers are swapped between the old SMs 105 and 107 via a transaction initiated at the AM 101, and the new SM 201 is activated, thereby restoring service for the lines involved. The pseudo-numbers are then removed, or de-grown, from the old switching module processors 207 and 209, which may then be removed.

The example of FIG. 2 shows transfer of lines from two old modules to a single new module. The present invention is applicable to switching of lines from one or more old modules to one or more new modules, provided capacity in the new module is sufficient to support the lines from the old modules.

Figure 3:
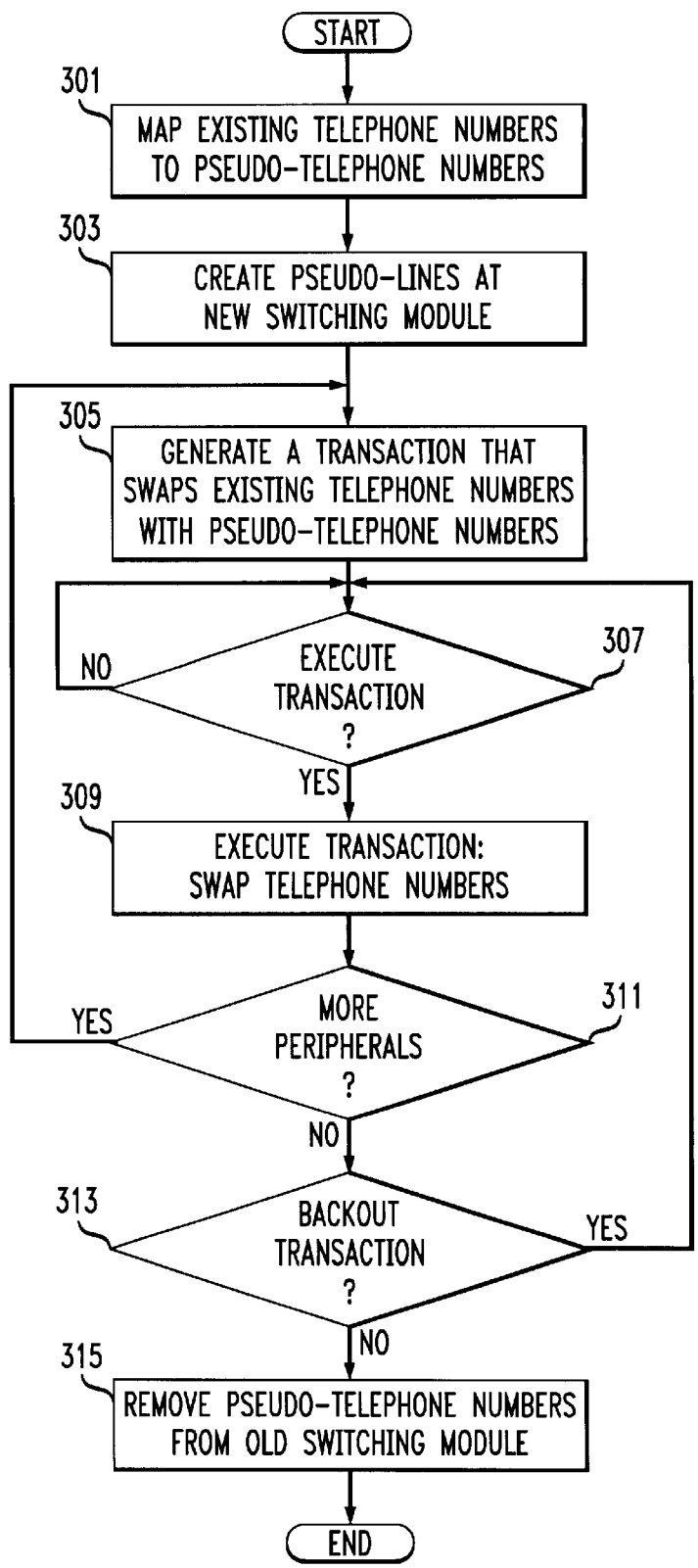
FIG. 3 is a flowchart showing a method of transferring lines between switching modules in accordance with the invention.

A flowchart showing a method of transferring lines between switching modules is shown in FIG. 3. The method may be implemented as a software tool that resides in the AM 101, and may be a UNIX-based software tool, e.g., a computer-readable program code within a computer-readable signal bearing medium. The AM 101 executes the code of the software tool and forwards commands indicated by the tool to the CM 103 for distribution to the appropriate switching module 105, 107, or 201 for each commands.

At step 301, existing telephone numbers from one or more old switching modules 105 and 107 are mapped to pseudo-telephone numbers at a new switching module 201. The mapping of existing numbers to pseudo-numbers may be provided in a relational database. At step 303, pseudo-lines are created via normal human-machine interface at the new switching module 201 for each of the existing lines to be transferred from the old modules 105 and 107. Many methods may be utilized to create the pseudo-lines. An example of such a method utilizes an attached processor to interface with the AM 101 and generate a text-based script called Apptext that is input into a UNIX-based Apptext process to parse the input, e.g., definitions and characteristics of the existing lines, and create the pseudo-lines. This software tool uses the mapping for the pseudo-lines to create binary files that may be used by existing human-machine interfaces on the AM 101 to create the pseudo-lines that mimic the existing lines. The pseudo-lines include a pseudo-telephone number and routing information, which routes the telephone calls to the new switching module rather than the old switching module. Line data is downloaded or copied from the old module(s) 105 or 107 to the new module 201. The creation of pseudo-lines may be performed outside the normal maintenance window, and thus does not affect the normal operation of the switch, and as a result, the end user experiences a maximum total service outage of a few minutes, rather than an outage on the order of an hour.

At step 305, a transaction is generated that, when executed, swaps the telephone numbers with the pseudo-telephone numbers. In other words, upon execution, the existing telephone numbers are stored in the appropriate location within the new switching module 201, and the pseudo-telephone numbers are stored in the associated location within the old switching module 105 or 107. Steps 301, 303, and 305 are advantageously performed while the existing lines continue to operate from the old modules 105 and 107. Once steps 301, 303, and 305 are performed, the process to physically exchange lines between the old and new modules may be carried out.

At step 307, the process waits for a trigger to execute the transaction. The execution of the transaction may take place upon a user request to commit the line data to be swapped between the old module(s) and the new module(s) 201. Typically, the user gives this request once the physical lines, e.g., the PICBs and PIDBs, are moved from the old modules 105 and 107 to the new modules 201. Typically, when physical exchange of the lines is complete, the order to execute the transaction is given, for example, by keyboard entry through a software program associated with the AM 101. The order may, however, be given at any time prior to activation of the new switch. Once the trigger is received at step 307, the process continues with step 309, where the transaction is executed, i.e., the telephone numbers are swapped between the old SMs 105 and 107 and the new SM 201.

Swapping of telephone numbers is effectively swapping of routing information for the lines involved. The process of executing the transaction, i.e., committing the mapping of numbers from step 301, takes place almost immediately, e.g., in a few seconds or less, and effectively does not increase or affect service interruption. After execution of step 309, proper origination and termination for phone calls for lines that are transferred from the old SMs 105 and 107 may now be serviced by the new SM 201.

At step 311, if there are additional peripheral units to cut-over, the process continues with step 305. In the example shown in FIG. 3, steps 305 through 309 are performed for each peripheral unit 203 and 205, one peripheral unit at a time, e.g., the PIDB/PICB lines are moved together. When there are no more peripheral units to move at step 311, the process continues with step 313, where the operator has the option to backout of the transaction, i.e., reverse the execution of the swap that took place at step 309, in which case the process continues with step 307. If at step 313 the operation of step 309 is acceptable, the process continues with step 315. At step 315, the pseudo-telephone numbers, which now reside in the old switching modules 105 and 107, may be removed, i.e., the old SMs 105 and 107 are de-grown (physically removed from the switch), using a known procedure.

The present invention provides a robust process that automatically programs line data, creates lines, and swaps telephone numbers/routing information between modules in a single transaction. Manual data transfer and configuration of the new switching module, which may be error prone due to human intervention, is not required. The downtime for an affected line is controlled primarily by the time it takes to physically exchange the lines between the modules, i.e., on the order of a few minutes. Time consuming processes of the present invention are advantageously performed without interrupting service to the subscribers served by the switch, thereby minimizing customer service outages. Because prior methods involved service outages on the order of an hour, the present method provides significant improvement over prior methods in terms of reduced time for customer service outages, reduced cost, and productivity improvement. Many switching modules may be transferred in one night, rather than only a few.

The present invention may be embodied in other specific forms without departing from its spirit or essential characteristics. The described embodiments are to be considered in all respects only as illustrative and not restrictive. The scope of the invention is, therefore indicated by the appended claims rather than by the foregoing description. All changes that come within the meaning and range of equivalency of the claims are to be embraced within their scope.

What is claimed is:

1. A method comprising the steps of:
   mapping a plurality of existing telephone numbers for a plurality of existing lines at a first switching module to a plurality of pseudo-telephone numbers;
   for each of the plurality of existing lines, creating a pseudo-line at a second switching module, yielding a plurality of pseudo-lines;
   generating a transaction that swaps the telephone numbers in the first switching module with the pseudo-telephone numbers in the second module;
   executing the transaction.

2. The method of claim 1, further comprising the step of removing the pseudo-telephone numbers from the first switching module.

3. The method of claim 1, wherein the transaction swaps the telephone numbers in the first switching module with the pseudo-telephone numbers in the second switching module without affecting service interruption.

4. The method of claim 1, wherein the plurality of pseudo-lines include telephone features and routing information related to the plurality of existing telephone numbers.

5. The method of claim 1, wherein the step of executing is performed upon request.

6. The method of claim 1, wherein the step of executing is performed after at least one line is transferred from the first switching module to the second switching module.

7. The method of claim 1, wherein each of the plurality of existing telephone numbers comprises origination information and termination information.

8. The method of claim 1, wherein at least one peripheral device at the first switching module is utilized in conjunction with the second switching module.

9. The method of claim 1, wherein the method steps are implemented as computer readable program code within a computer-readable signal bearing medium.

10. An apparatus comprising:
    a mapper, arranged and constructed to map a plurality of existing telephone numbers for a plurality of existing lines at a first switching module to a plurality of pseudo-telephone numbers;
    a line generator, arranged and constructed to create, for each of the plurality of existing lines, a pseudo-line at a second switching module, yielding a plurality of pseudo-lines;
    a transaction generator, arranged and constructed to generate a transaction that swaps the telephone numbers in the first switching module with the pseudo-telephone numbers in the second module;
    an execution device that executes the transaction.

11. The apparatus of claim 10, wherein the plurality of pseudo-lines include telephone features and routing information related to the plurality of existing telephone numbers.

12. The apparatus of claim 10, wherein the execution device is activated upon a user's request.

13. The apparatus of claim 10, wherein at least one peripheral device at the first switching module is utilized in conjunction with the second switching module.

14. The apparatus of claim 10, wherein the apparatus comprises a computer-readable signal bearing medium that utilizes computer readable program code.

15. A computer-readable signal bearing medium comprising:
    computer readable program code for mapping a plurality of existing telephone numbers for a plurality of existing lines at a first switching module to a plurality of pseudo-telephone numbers;
    computer readable program code for creating a pseudo-line at a second switching module for each of the plurality of existing lines, yielding a plurality of pseudo-lines;
    computer readable program code for generating a transaction that swaps the telephone numbers in the first switching module with the pseudo-telephone numbers in the second module; and
    computer readable program code for executing the transaction.

16. The computer-readable signal bearing medium of claim 15, further comprising computer readable program code for removing the pseudo-telephone numbers from the first switching module.

17. The computer-readable signal bearing medium of claim 15, wherein the transaction swaps the telephone numbers in the first switching module with the pseudo-telephone numbers in the second switching module without affecting service interruption.

18. The computer-readable signal bearing medium of claim 15, wherein the plurality of pseudo-lines include telephone features and routing information related to the plurality of existing telephone numbers.

19. The computer-readable signal bearing medium of claim 15, wherein each of the plurality of existing telephone numbers comprises origination information and termination information.

* * * * *